UNITED STATES PATENT OFFICE.

ALFRED SCHAARSCHMIDT AND BERTRAM MAYER, OF BASEL, SWITZERLAND, ASSIGNORS TO THE FIRM OF SOCIETY OF CHEMICAL INDUSTRY IN BASLE, OF BASEL, SWITZERLAND.

BROWN VAT DYE AND PROCESS OF MAKING SAME.

No. 915,385. Specification of Letters Patent. Patented March 16, 1909.

Application filed August 11, 1908. Serial No. 448,039.

*To all whom it may concern:*

Be it known that we, ALFRED SCHAARSCHMIDT, doctor of philosophy and chemist, a subject of the King of Saxony, and BERTRAM MAYER, doctor of philosophy and chemist, a subject of the King of Bavaria, both residents of Basel, Switzerland, have invented new and useful Brown Vat Dyestuffs and a Process of Making Same, of which the following is a full, clear, and exact specification.

We have found that by heating amidoderivatives, alkylamidoderivatives and acidylamidoderivatives of 2-methylanthraquinone and of its substitution products with sulfur to a high temperature, new sulfurized dyestuffs are produced which are insoluble in alkali sulfid but can be made into a vat with aid of alkali-hydrosulfite solution; the vat thus obtained dyes cotton directly without a mordant yellowish-brown to violet-brown tints of excellent fastness.

The following examples illustrate the invention.

*Example I:* 20 parts of 1-amido-2-methyl-anthraquinone are heated with 60 parts of sulfur in an oil bath to 240–280° C. until the evolution of hydrogen sulfid has ceased. The cooled mass is finely powdered and the excess of sulfur is extracted from it by carbon bisulfid or a sodium sulfid solution. The dyestuff thus purified is a black powder, insoluble in dilute acids and alkalies, as well as in most organic solvents, such as alcohol, glacial acetic acid or benzene. In nitrobenzene, quinolin, and anilin it is sparingly soluble to a reddish brown solution. The solution in concentrated sulfuric acid is brown. With hydrosulfite the dyestuff yields a brown vat from which cotton is dyed intense brown tints. In both dyeing and printing, the dyestuff is best used as a paste such as can be obtained by known methods, for instance by dissolving the dyestuff in concentrated sulfuric acid and allowing the solution to run into ice-water, or by blowing air through an alkaline solution.

*Example II:* 10 parts of diamido-2-methylanthraquinone, made for instance by the dinitration of 2-methylanthraquinone and subsequent reduction with sodium sulfid, are well mixed with 30 parts of sulfur and the mixture is heated to 250–280° C. for some hours. From the cooled and powdered mass, the excess of sulfur is extracted by boiling with sodium sulfid solution. The residue forms a black powder which dissolves in hot nitrobenzene and anilin to a violet red solution, and in concentrated sulfuric acid to a brown solution. The alkaline hydrosulfite vat is violet brown. On cotton the new dyestuff yields intense violet brown dyeings of excellent fastness to washing and light.

*Example III:* 10 parts of monoamido-2-methyl-3-chloranthraquinone, made for instance by nitrating 2-methyl-3-chloranthraquinone and subsequent reduction with sodium sulfid, are heated with 30 parts of sulfur at 240°–280° C. until evolution of hydrogen sulfid becomes very slight, which happens after 3–4 hours. The dyestuff, freed in the usual manner from excess of sulfur, forms a dark brown powder, dissolves in concentrated sulfuric acid to a violet brown solution and in fuming sulfuric acid containing 24 per cent. of sulfuric anhydrid, to a green solution. Cotton is dyed by the dyestuff in alkaline hydrosulfite vat, beautiful yellow brown tints.

Dyestuffs of similar properties are obtained if the amidoderivatives of the foregoing examples are replaced by other amidoderivatives of 2-methylanthraquinone as for instance 2-methyl-3-amidoanthraquinone melting at 250° C., mono- or diamido-1:3-dimethylanthraquinone, 1:3-diamido-2-methylanthraquinone, mono- or dimethyl-amido-2-methylanthraquinone, acetamido-2-methylanthraquinone, or 1-amido-4-brom-2-methylanthraquinone.

What we claim is:

1. The described process for the manufacture of brown vat dyestuffs of the anthraquinone-series, which consists in heating amido-derivatives of 2-methylanthraquinone and of its substitution products with sulfur to a high temperature.

2. The described process for the manufacture of brown vat-dyestuffs of the anthraquinone-series by heating amido-2-methylanthraquinone, its alkyl- and acidylderivatives, with sulfur to a high temperature.

3. The described process for the manufacture of brown vat-dyestuffs of the anthraquinone-series by heating diamido-2-methylanthraquinone, its alkyl- and acidylderivatives with sulfur to a high temperature.

4. As new products, the vat-dyestuffs, obtainable by heating amido-derivatives of 2-methylanthraquinone and its substitution products, with sulfur to a high temperature, constituting, in dry state, dark brown to black powders, soluble in concentrated sulfuric acid to brown to violet-brown solutions, insoluble in alcohol, glacial acetic acid and benzene, and yielding with alkaline reducing agents brown to violet vats dyeing unmordanted cotton yellowish brown to violet-brown tints fast to washing and light.

5. As new products, the vat-dyes, obtainable by heating amido-2-methylanthraquinone, its alkyl- and acidylderivatives with sulfur to a high temperature, constituting, in dry state, dark brown to black powders, soluble in concentrated sulfuric acid with a brown to violet-brown coloration, insoluble in alcohol, glacial acetic acid and benzene and yielding with alkaline reducing agents brown to violet vats dyeing unmordanted cotton yellowish-brown to violet-brown tints.

6. As new products, of manufacture the vat-dyes, obtainable by heating diamido-2-methylanthraquinone, its alkyl- and acidyl-derivatives with sulfur to a high temperature, constituting, in dry state, dark brown to black powders, soluble in concentrated sulfuric acid with a brown to violet-brown coloration, insoluble in alcohol, glacial acetic acid and benzene, and yielding with alkaline reducing agents brown to violet-brown vats dyeing unmordanted cotton from yellowish brown to violet-brown tints.

In witness whereof we have hereunto signed our names this 29th day of July 1908, in the presence of two subscribing witnesses.

ALFRED SCHAARSCHMIDT.
BERTRAM MAYER.

Witnesses:
 GEO. GIFFORD,
 ERNST WAGNER.